(12) United States Patent
Hsiu

(10) Patent No.: US 9,336,973 B2
(45) Date of Patent: May 10, 2016

(54) SWITCH MECHANISM FOR ACTIVATING DIFFERENT SWITCHES AND PORTABLE ELECTRONIC DEVICE THEREWITH

(71) Applicant: Wistron Corporation, New Taipei (TW)

(72) Inventor: Chen-Min Hsiu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 443 days.

(21) Appl. No.: 13/922,253

(22) Filed: Jun. 20, 2013

(65) Prior Publication Data
US 2014/0054142 A1 Feb. 27, 2014

(30) Foreign Application Priority Data

Aug. 22, 2012 (TW) .............................. 101130483 A

(51) Int. Cl.
*H01H 25/00* (2006.01)
*H01H 15/08* (2006.01)
*H01H 15/10* (2006.01)
(Continued)

(52) U.S. Cl.
CPC ............. *H01H 25/00* (2013.01); *G06F 1/1671* (2013.01); *H01H 13/14* (2013.01); *H01H 15/08* (2013.01); *H01H 15/10* (2013.01); *H01H 25/002* (2013.01);
(Continued)

(58) Field of Classification Search
USPC .......................... 200/5 R, 5 B, 176, 177, 547
IPC ................ H01H 9/00,15/00, 25/00, 2001/0068, H01H 15/08, 15/10, 2025/004, 25/002
See application file for complete search history.

(56) References Cited

U.S. PATENT DOCUMENTS 3,369,100 A * 2/1968 Kussy .................. H01H 15/102
200/330
4,670,629 A * 6/1987 VanBenthuysen ... H01H 13/562
200/16 D
(Continued)

FOREIGN PATENT DOCUMENTS

CN 101206501 A 6/2008
CN 201966112 U 9/2011
(Continued)

OTHER PUBLICATIONS

Office action mailed on Sep. 11, 2014 for the Taiwan application No. 101130483, filing date: Aug. 22, 2012, p. 2 line 6-26, p. 3-7 and p. 8 line 1-19.
(Continued)

*Primary Examiner* — David Warren
(74) *Attorney, Agent, or Firm* — Winston Hsu; Scott Margo

(57) ABSTRACT

A switch mechanism includes a button, a pressing component, a linking component and an activating component. The button is for moving in a first direction or a second direction. The pressing component is connected to a bottom side of the button and is for pressing a first switch component when the button moves in a first direction. An end of the linking component is connected to the button, and the linking component is driven by the button in a second direction as the button moves in the second direction. The activating component is detachably contacted with the linking component, and the activating component is driven by the linking component when the linking component moves to an activating position in the second direction, so as to activate a second switch component in a third direction.

20 Claims, 12 Drawing Sheets

(51) Int. Cl.
*H01H 13/14* (2006.01)
*G06F 1/16* (2006.01)

(52) U.S. Cl.
CPC ........ *G06F 1/1616* (2013.01); *H01H 2025/004* (2013.01)

(56) References Cited

U.S. PATENT DOCUMENTS

| | | | | |
|---|---|---|---|---|
| 4,871,885 | A * | 10/1989 | Kamada | B60R 16/005 200/16 R |
| 5,442,149 | A * | 8/1995 | Sato | H01H 13/84 200/293 |
| 5,721,405 | A * | 2/1998 | Hamada | H01H 25/008 200/16 R |
| 5,861,594 | A * | 1/1999 | Akimoto | B60Q 1/1469 200/61.27 |
| 6,603,459 | B2 * | 8/2003 | Matsufusa | G05G 9/04 200/11 J |
| 7,148,880 | B2 * | 12/2006 | Magara | A61B 6/463 200/5 R |
| 7,363,634 | B2 | 4/2008 | Lin | |
| 7,898,440 | B2 * | 3/2011 | Chen | H01H 13/705 200/252 |
| 8,299,383 | B2 * | 10/2012 | Yang | H01H 13/56 200/526 |
| 8,569,643 | B2 * | 10/2013 | Ames, IV | H01H 15/102 200/502 |
| 2002/0039337 | A1 * | 4/2002 | Seto | G11B 7/0956 369/53.19 |
| 2005/0213438 | A1 * | 9/2005 | Ide | G11B 17/056 369/24.01 |
| 2005/0224332 | A1 * | 10/2005 | Yamaguchi | H01H 15/107 200/547 |
| 2006/0026616 | A1 * | 2/2006 | Omori | G11B 7/22 720/658 |
| 2008/0150894 | A1 * | 6/2008 | Chiang | G06F 3/0338 345/163 |
| 2010/0271913 | A1 * | 10/2010 | Kaneko | G11B 20/00115 369/47.14 |
| 2012/0134077 | A1 * | 5/2012 | Ladouceur | H01H 13/705 361/679.01 |
| 2014/0054142 | A1 * | 2/2014 | Hsiu | H01H 25/00 200/16 R |
| 2015/0152957 | A1 * | 6/2015 | Maeta | H01H 1/403 200/5 R |

FOREIGN PATENT DOCUMENTS

| | | |
|---|---|---|
| TW | 201012345 | 3/2010 |
| TW | 201013724 | 4/2010 |
| TW | M404463 U1 | 5/2011 |
| TW | 201137866 A1 | 11/2011 |

OTHER PUBLICATIONS

Office action mailed on Mar. 10, 2015 for the China application No. 201210349235.2, p. 3 line 4-31, p. 4-10 and p. 11 line 1-24.

* cited by examiner

SWITCH MECHANISM FOR ACTIVATING DIFFERENT SWITCHES AND PORTABLE ELECTRONIC DEVICE THEREWITH

BACKGROUND OF THE INVENTION

1. Field of the Invention

The present invention relates to a switch mechanism and a portable electronic device therewith, and more specifically, to a switch mechanism capable of activating different switch components and a portable electronic device therewith.

2. Description of the Prior Art

A conventional notebook computer often has various kinds of extension modules, such as an optical drive, to expand functions of the notebook computer. Generally speaking, a button is often disposed on a bezel of the optical drive for users to press, so as to activate a switch of the optical drive to transmit a corresponding signal to an inner mechanism of the optical drive. As a result, a tray of the optical drive is ejected from a casing of the notebook computer, so that users can take out or place a disc. However, a design trend of the notebook computer is slim and light in recent years, and appearance of the casing of the notebook computer tends to be simple. Amounts of connectors and buttons disposed inside the notebook computer have to be decreased for meeting requirements of a slim and light size of the notebook computer and the simple appearance of the notebook computer. However, it is desired to reserve functions corresponding to the multiple buttons in a situation of decreasing the amounts of the buttons, so that it is an important issue to design a switch mechanism with multiple functions.

SUMMARY OF THE INVENTION

The present invention is to provide a switch mechanism capable of activating different switch components and a portable electronic device therewith to solve above problems.

According to the disclosure, a switch mechanism includes a button, a pressing component, a linking component and an activating component. The button is for moving in a first direction and a second direction. The pressing component is connected to a bottom side of the button, and the pressing component being for pressing a first switch component when the button moves in the first direction. An end of the linking component is connected to the button, and the linking component is driven by the button in the second direction as the button moves in the second direction. The activating component detachably contacts with the linking component, and the activating component is driven by the linking component when the linking component moves to an activating position in the second direction, so as to activate a second switch component in a third direction.

According to the disclosure, an inclined structure is formed on the linking component, and the inclined structure is for sliding relative to the activating component, so as to drive the activating component in the third direction to activate the second switch component.

According to the disclosure, the activating component further includes an activating portion and a linking portion. The activating portion is for activating the second switch component. The linking portion is connected to the activating portion, and the linking portion is at a rear side of the inclined structure as the linking component is in an initial position, the linking portion moves relative to an inner inclined surface of the inclined structure to separate from the inclined structure as the linking component moves in the second direction.

According to the disclosure, the linking portion contacts an outer inclined surface of the inclined structure after separating from the inclined structure and moving in a direction opposite to the third direction, and the linking portion is driven to slide in the third direction relative to the outer inclined surface of the inclined structure, so that the linking component moves in the second direction.

According to the disclosure, a hole is formed on the linking component, and the pressing component passes through the hole as the button is pressed downward, so as to activate the first switch component.

According to the disclosure, the switch mechanism further includes a resilient component and a returning component. The resilient component is disposed on the pressing component and between the button and the linking component, and the resilient component is for driving the button to move in a direction opposite to the first direction. The returning component is connected to the linking component, and the returning component is for driving the linking component to move in a direction opposite to the second direction.

According to the disclosure, the switch mechanism further includes at least one engaging component for engaging with linking component, so as to constrain a movement of the linking component in the first direction.

According to the disclosure, a guiding slot is formed on the linking component, and the switch mechanism further includes a fixing component passing through the guiding slot for guiding the linking component to move in the second direction.

According to the disclosure, the first direction, the second direction and the third direction are substantially vertical to one another.

According to the disclosure, a portable electronic device includes a casing, a first switch component, an expansion module, a second switch component and a switch mechanism. An opening is formed on the casing. The first switch component is installed inside the casing. The expansion module is disposed in a position corresponding to the opening. The second switch component is installed inside the casing, and the second switch component is for activating the expansion module. The switch mechanism is for activating the first switch component and the second switch component. The switch mechanism includes a button, a pressing component, a linking component, and an activating component. The button is for moving in a first direction or a second direction. The pressing component is connected to a bottom side of the button, and the pressing component is for pressing the first switch component when the button moves in the first direction. An end of the linking component is connected to the button, and the linking component is driven by the button in the second direction as the button moves in the second direction. The activating component detachably is contacted with the linking component, and the activating component is driven by the linking component when the linking component moves to an activating position in the second direction, so as to activate the second switch component in a third direction.

According to the disclosure, the expansion module includes a tray and a plate, the tray is moveably disposed at the opening, the plate is connected to a side of the tray, the activating component is installed on the plate, and the tray is ejected from the opening in a direction opposite to the third direction after the activating component moves in the third direction to activate the second switch component.

The switch mechanism and the portable electronic device of the present invention are to combine the button which activates the power switch component with the activating component which activates the switch component of the optical drive via the linking component, so that the button can include functions of activating the power switch component and the switch component of the optical drive at the same time. That is, the button has a function of activating different switches. The activating component for activating the switch component of the optical drive is disposed inside the plate of the optical drive module instead of disposing another button on the outside of the plate to activate the optical drive module in the prior art, so that the switch mechanism of the present invention can not only decrease the amount of the buttons on the portable electronic device, but also can implement a design style of the simple appearance for tending to be slim and light in recent years. Therefore, it can overcome a disadvantage of too many buttons on a conventional notebook computer and the optical drive without the simple appearance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
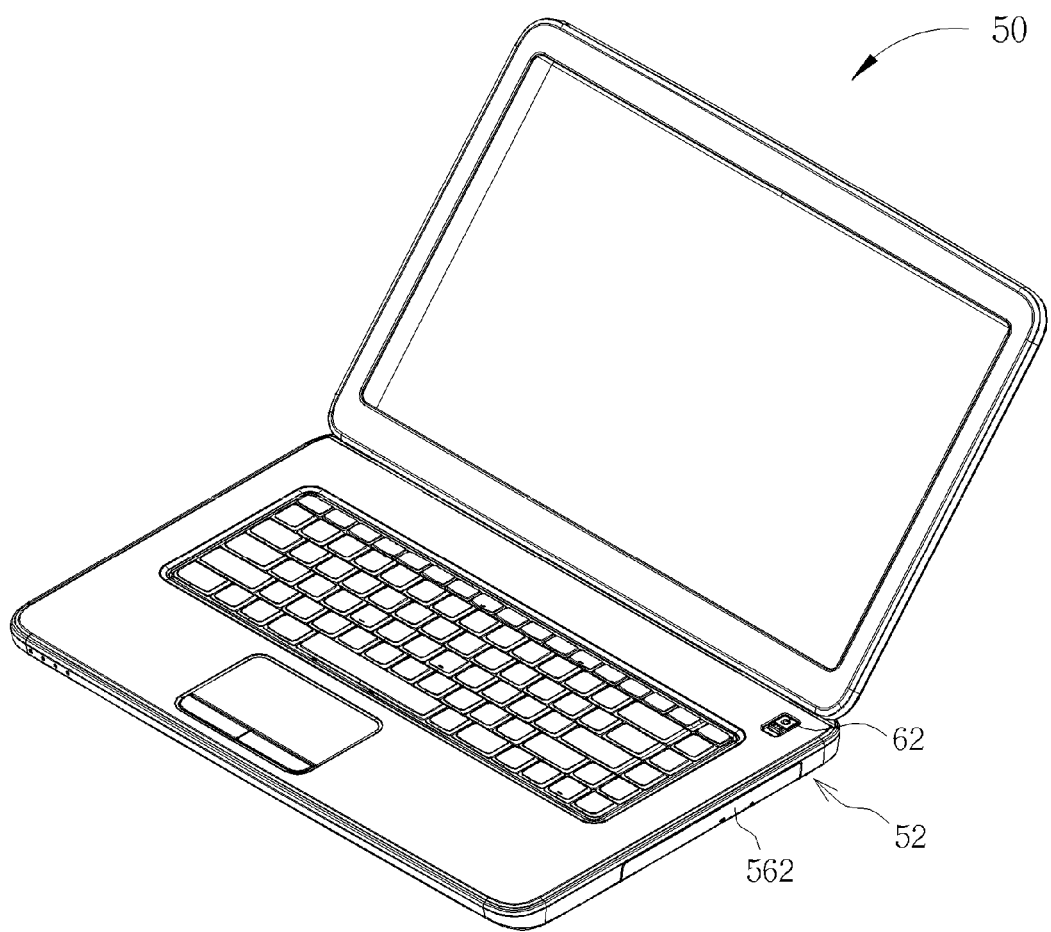
FIG. 1 is a diagram of a portable electronic device according to an embodiment of the present invention.
Figure 2:
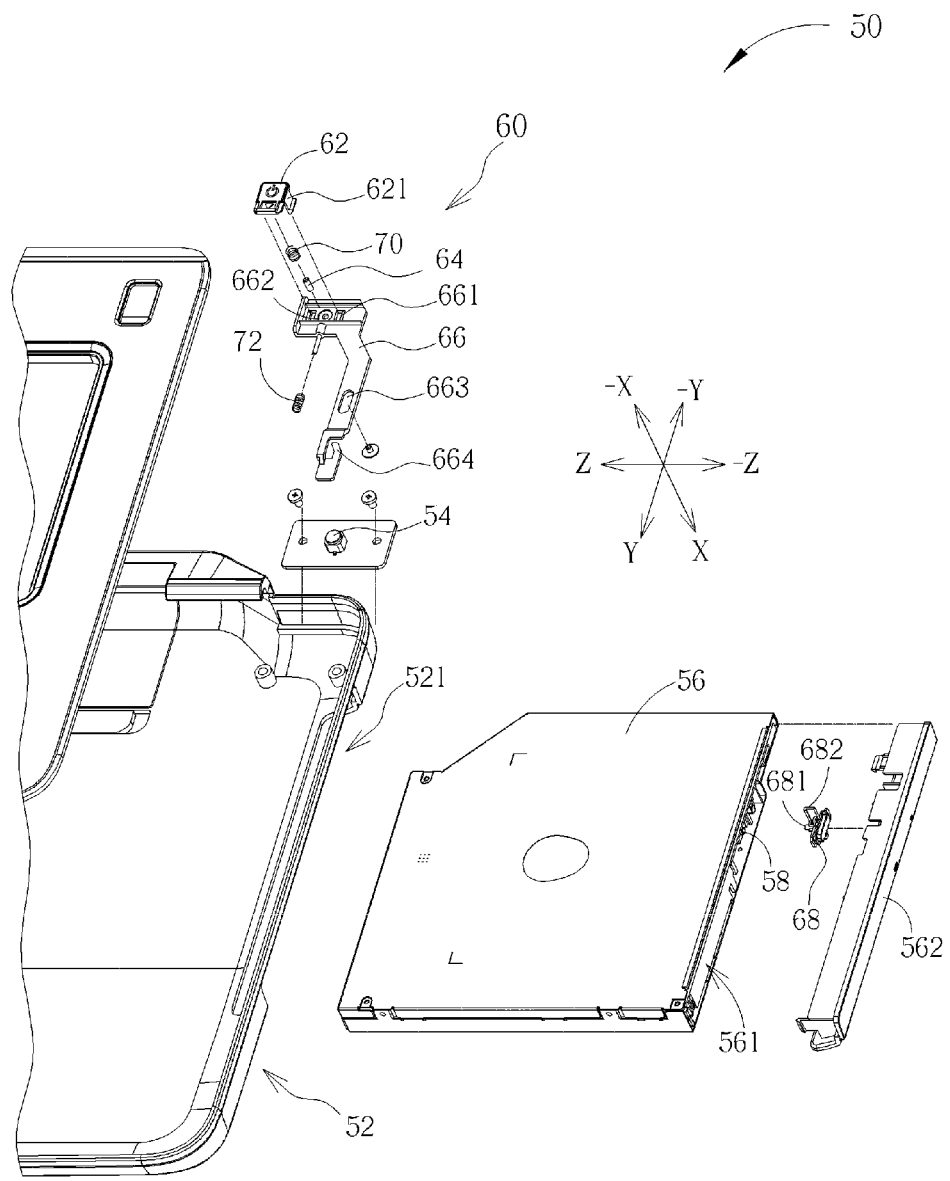
FIG. 2 is an exploded diagram of the portable electronic device according to the embodiment of the present invention.
Figure 3:
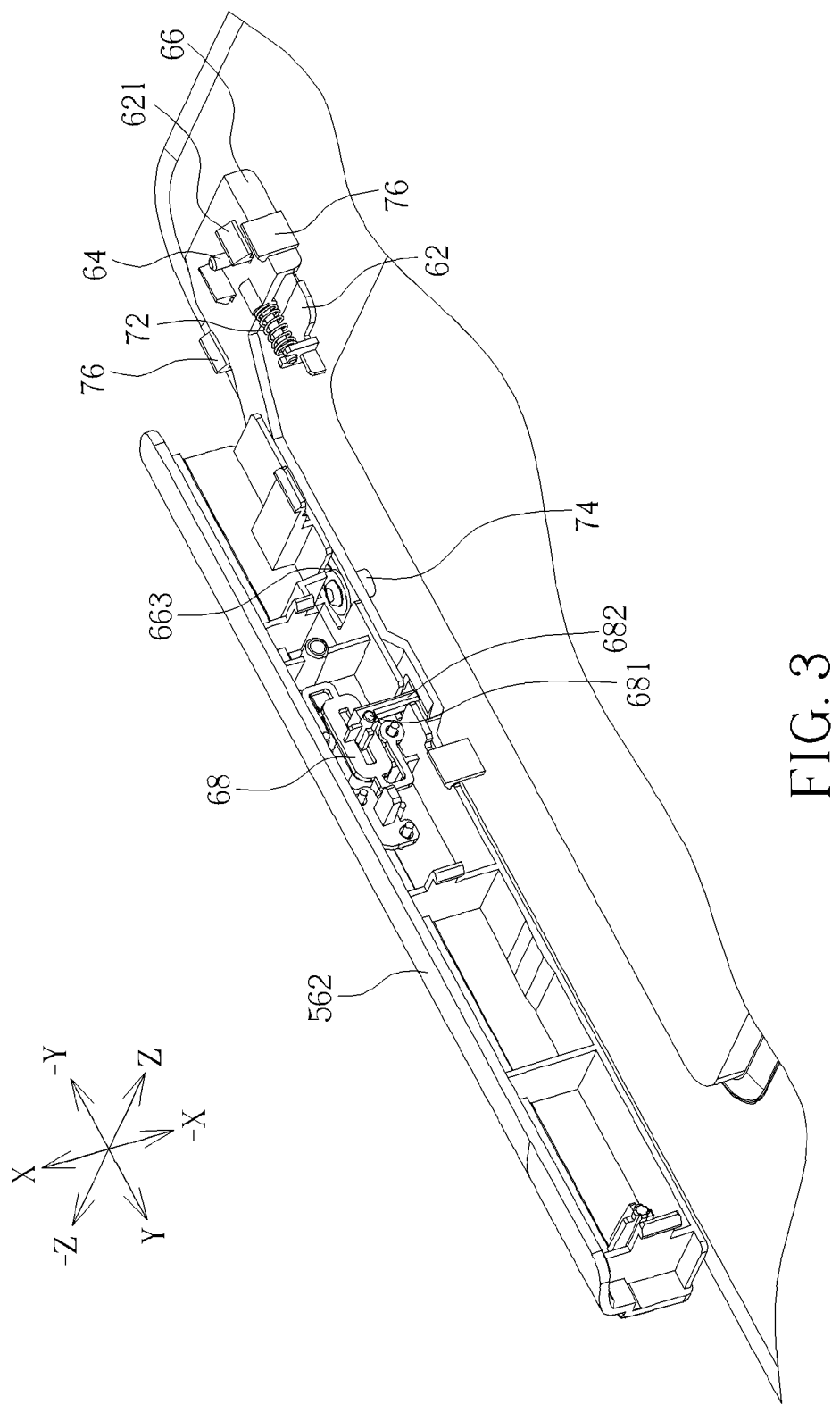
FIG. 3 is an inner structural diagram of the portable electronic device according to the embodiment of the present invention.

Please refer to FIG. 1 to FIG. 3. FIG. 1 is a diagram of a portable electronic device 50 according to an embodiment of the present invention. FIG. 2 is an exploded diagram of the portable electronic device 50 according to the embodiment of the present invention. FIG. 3 is an inner structural diagram of the portable electronic device 50 according to the embodiment of the present invention. The portable electronic device 50 can be a notebook computer. The portable electronic device 50 includes a casing 52 whereon an opening 521 is formed. The opening 521 can be disposed on any side of the casing 52, such as on a left side or a right side. In this embodiment, as shown in FIG. 2, the opening 521 is disposed on the right side of the casing 52. The portable electronic device 50 further includes a first switch component 54 installed inside the casing 52. In this embodiment, the first switch component 54 can be a power switch component for turning on or turning off the portable electronic device 50. The portable electronic device 50 further includes an expansion module 56 disposed in a position corresponding to the opening 521 of the casing 52. That is, the expansion module 56 and the opening 521 are both disposed on the right side of the casing 52 in this embodiment. The expansion module 56 can be an optical drive module including a tray 561 and a plate 562. The plate 562 can be a bezel. The tray 561 is movably disposed through the opening 521, and the plate 562 is connected to a side of the tray 561. As the tray 561 is contained inside the opening 521 of the casing 52, the plate 562 can cover the opening 521, so as to prevent an external object from entering into the expansion module 56 and to maintain the uniform appearance of the portable electronic device 50. The portable electronic device 50 further includes a second switch component 58 installed inside the casing 52, and the second switch component 58 can be a switch component of the optical drive for activating the expansion module 56.

The portable electronic device 50 further includes a switch mechanism 60 for activating the first switch component 54 and the second switch component 58. The switch mechanism 60 includes a button 62 and a pressing component 64. The pressing component 64 is connected to a bottom side of the button 62, and the pressing component 64 is for pressing the first switch component 54 when the button 62 is driven to move in a first direction (+X direction). The switch mechanism 60 further includes a linking component 66, and an end of the linking component 66 is connected to the button 62. At least one engaging hole 661 is formed on the end of the linking component 66, and the button 62 includes at least one hook 621. In this embodiment, two engaging holes 661 are formed on the end of the linking component 66, and the button 62 includes two hooks 621 accordingly. The two hooks 621 are respectively engaged with the two engaging holes 661, so as to fix the button 62 on the linking component 66. A combination mechanism of the button 62 and the linking component 66 is not limited to this embodiment. In addition, positions and amounts of the engaging holes 661 and hooks 621 are not limited to this embodiment, and it depends on practical design demand. Moreover, a hole 662 is formed on the linking component 66, and the pressing component 64 passes through the hole 662 as the button 62 is pressed downward in the first direction (+X direction), so as to activate the first switch component 54. Furthermore, as the button 62 moves in a second direction (+Y direction), the linking component 66 is driven by the button 62 to move in the second direction (+Y direction) simultaneously.

The switch mechanism 60 further includes an activating component 68 installed on the expansion module 56 and for being detachably contacted with the linking component 66. The activating component 68 is driven by the linking component 66 when the linking component 66 moves to an activating position in the second direction (+Y direction), so as to activate the second switch component 58 in a third direction (+Z direction). The activating component 68 can be installed on the plate 562 of the expansion module 56. In this embodiment, it is noticed that the first direction (+X direction), the second direction (+Y direction) and the third direction (+Z direction) can be vertical to one another. The portable electronic device 50 of the present invention further includes a resilient component 70 disposed on the pressing component 64 between the button 62 and the linking component 66, and the resilient component 70 is for driving the button 62 to move in a direction (−X direction) opposite to the first direction (+X direction), so as to return the button 62 to a position where the button 62 is not pressed. In this embodiment, the resilient component 70 can sheathe the pressing component 64, and the resilient component 70 can be a spring. The portable electronic device 50 further includes a returning component 72 connected to the linking component 66, and the returning component 72 is for driving the linking component 66 to move in a direction (−Y direction) opposite to the second direction (+Y direction). The returning component 72 can be a spring. Please refer to the FIG. 3 and FIG. 5. A guiding slot 663 is further formed on the linking component 66 of the portable electronic device 50, and the switch mechanism 60 further includes a fixing component 74 passing through the guiding slot 663 for guiding the linking component 66 to move in the second direction (+Y direction). The fixing component 74 can be a screw component which is screwed inside the guiding slot 663. Please refer to FIG. 3. The portable electronic device 50 further includes at least one engaging component 76 for engaging with the linking component 66, so as to constrain a movement of the linking component 66 in the first direction (+X direction). In this embodiment, the portable electronic device 50 includes two engaging components 76. Amounts and positions of the engaging components 76 are not limited to this embodiment, and it depends on practical design demand.

Figure 4:
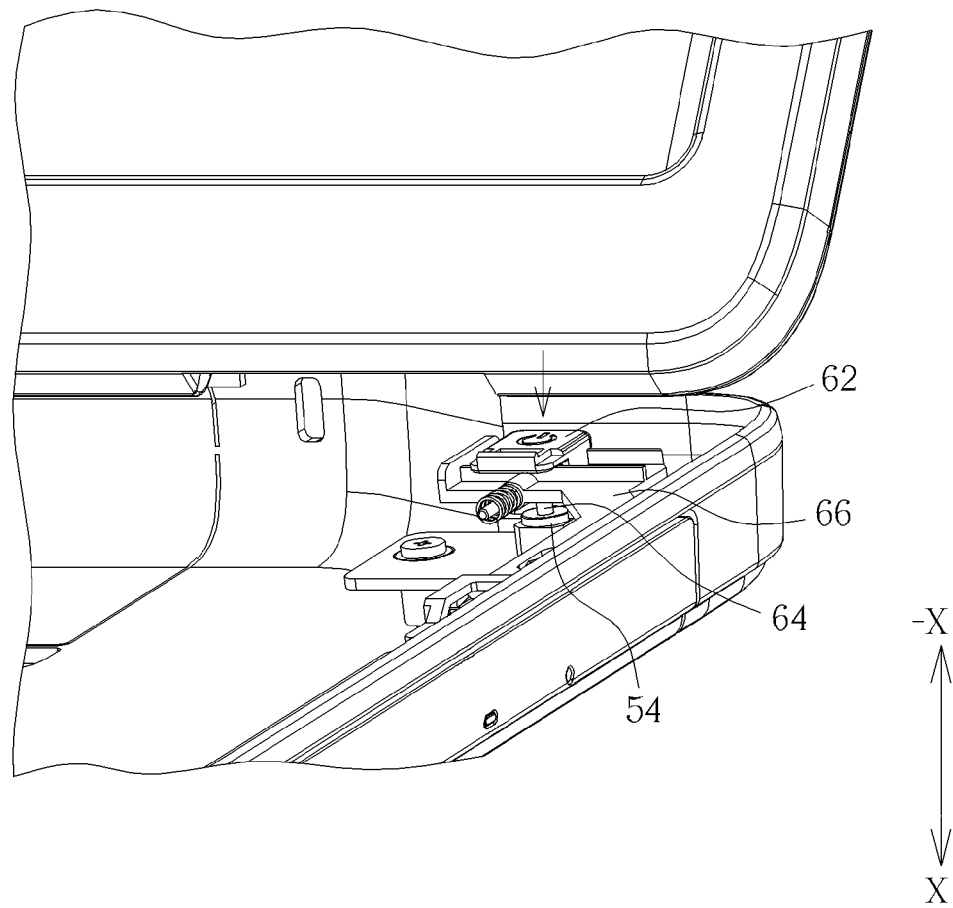
FIG. 4 is a diagram of a switch mechanism activating a first switch component according to the embodiment of the present invention.

An operation principle of the switch mechanism 60 for activating the first switch component 54 and the second switch component 58 is described as follows. Please refer to FIG. 4. FIG. 4 is a diagram of the switch mechanism 60 activating the first switch component 54 according to the embodiment of the present invention. Users can press the button 62 in the first direction (+X direction), so as to drive the pressing component 64 to move in the first direction (+X direction) to activate the first switch component 54. In this embodiment, the first switch component 54 can be the power switch component, so that it can turn on or turn off the portable electronic device 50 at this time. After the pressing component 64 activates the first switch component 54, if users release the button 62, the button 62 is returned by a resilient force of the resilient component 70 shown in FIG. 2 to move in the −X direction to the position where the button 62 is not pressed.

Figure 5:
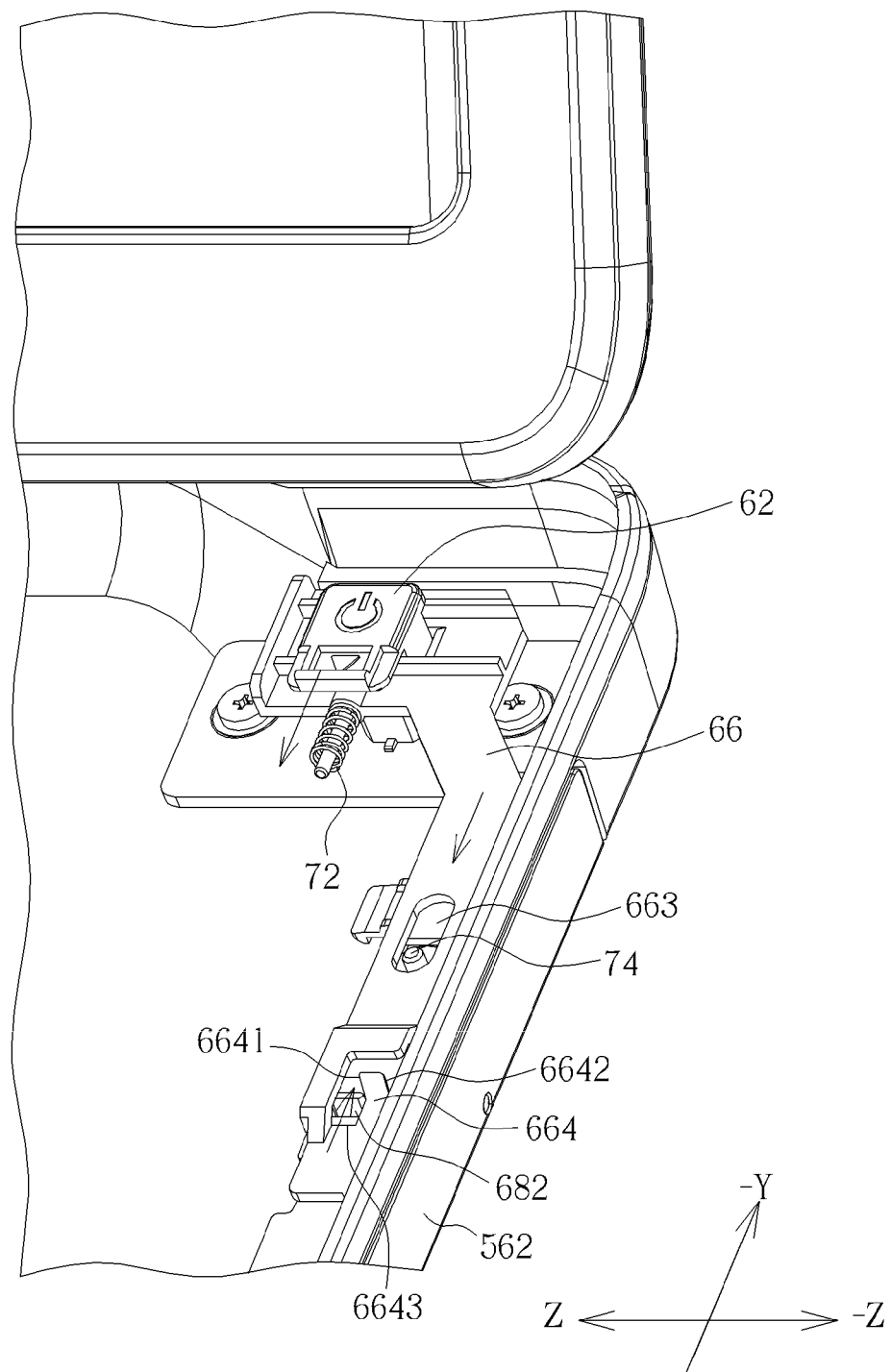
FIG. 5 to FIG. 9 are diagrams of the switch mechanism activating a second switch component according to the embodiment of the present invention.
Figure 6:
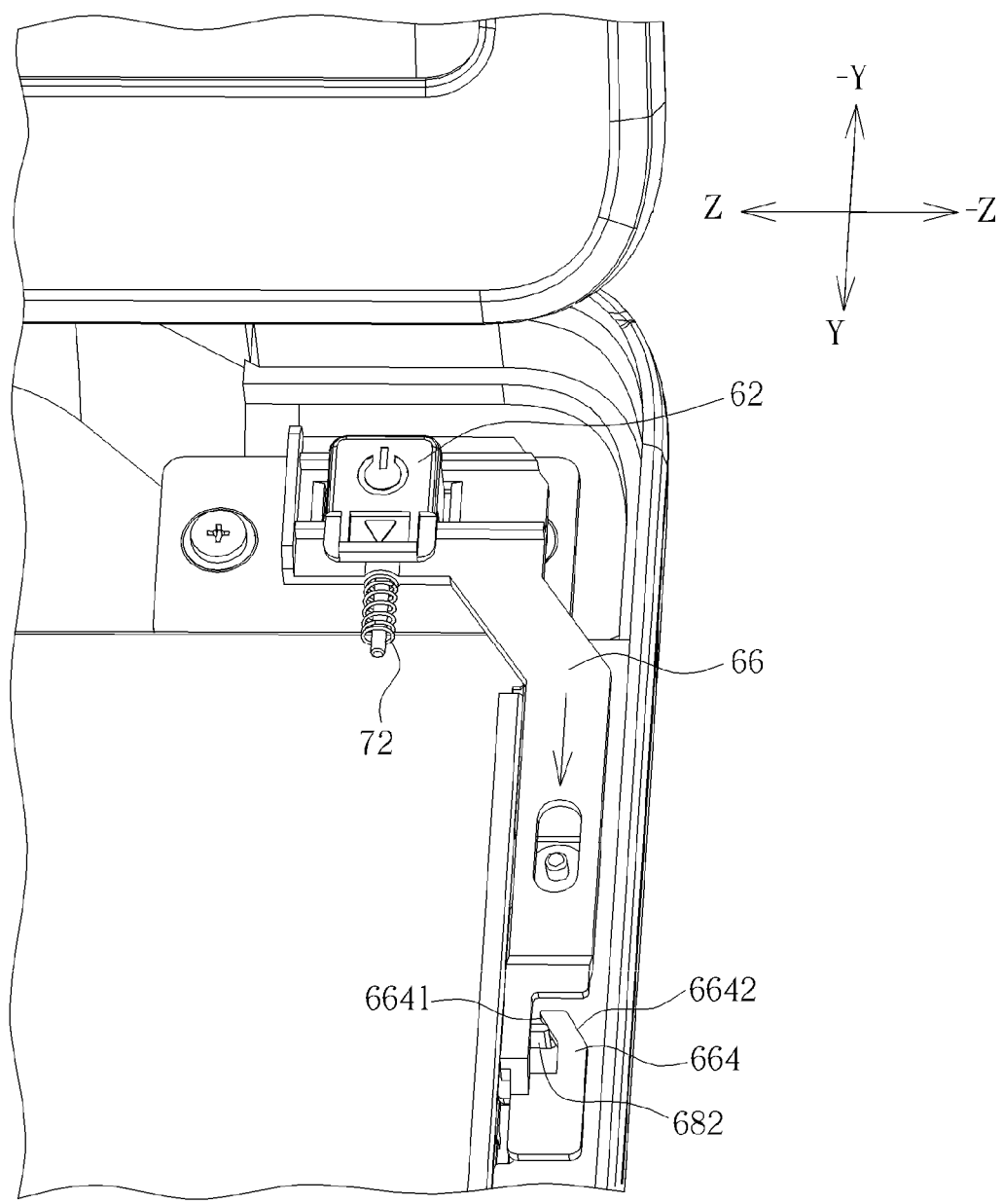
Figure 7:
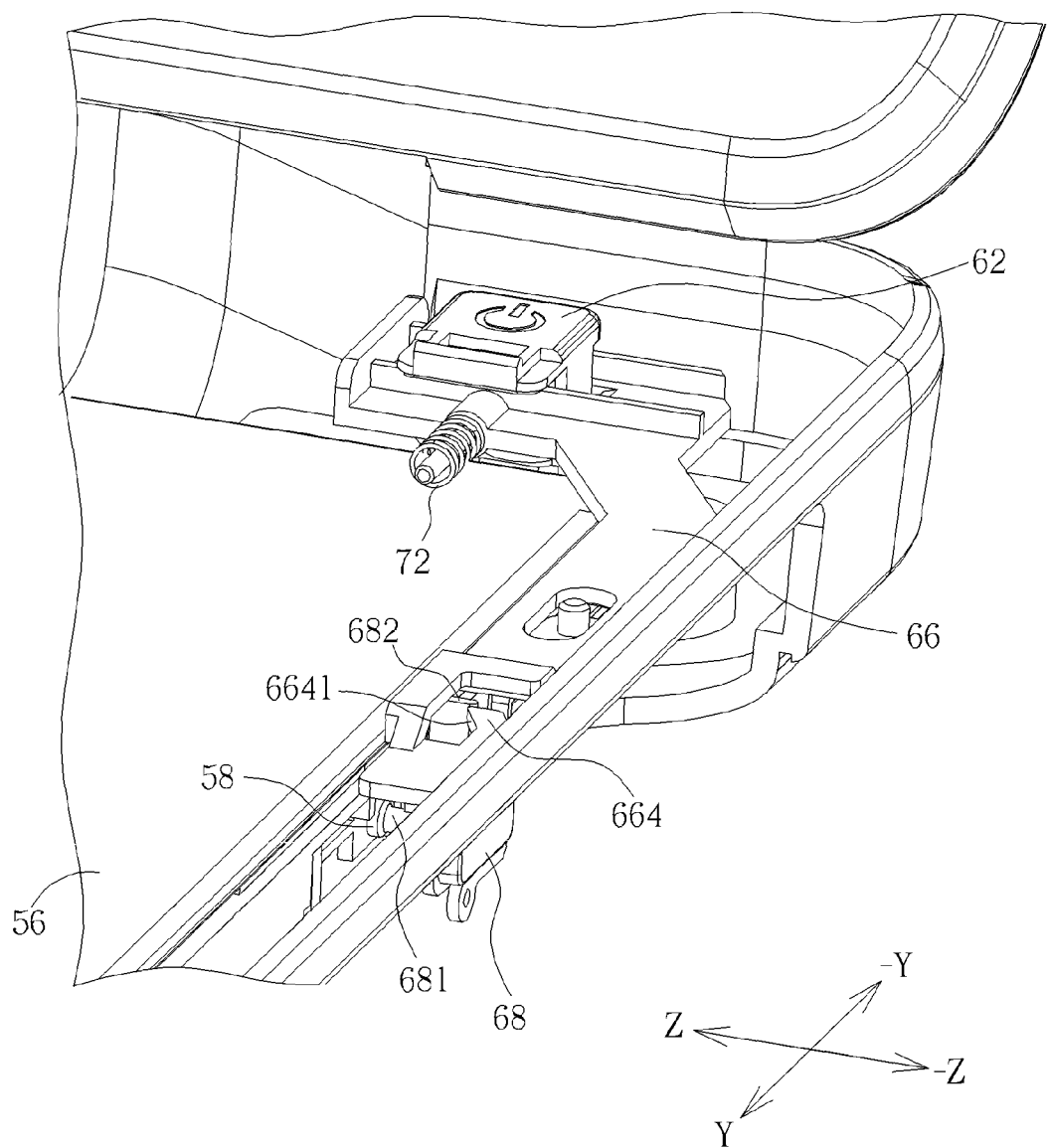
Figure 8:
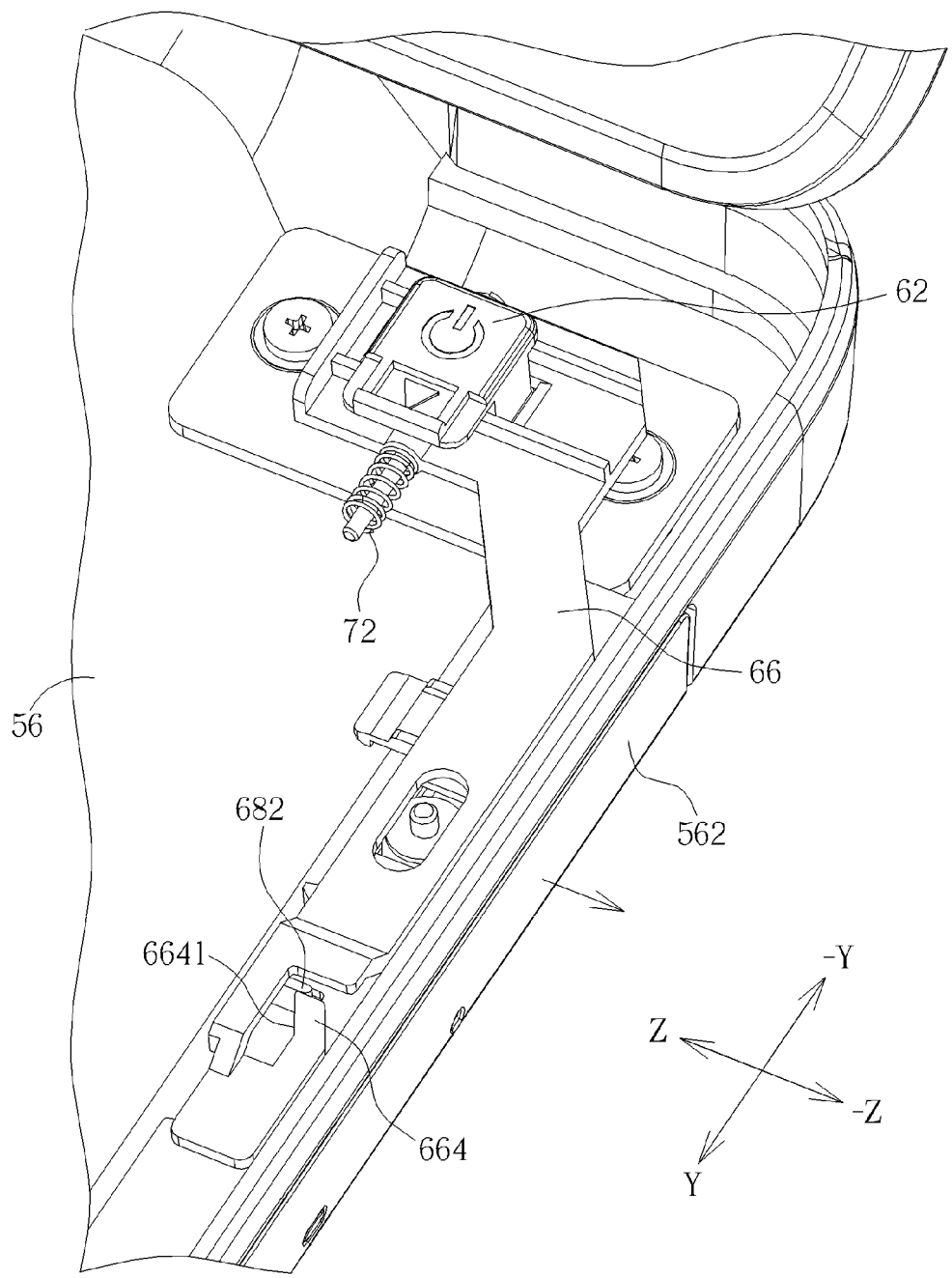
Figure 9:
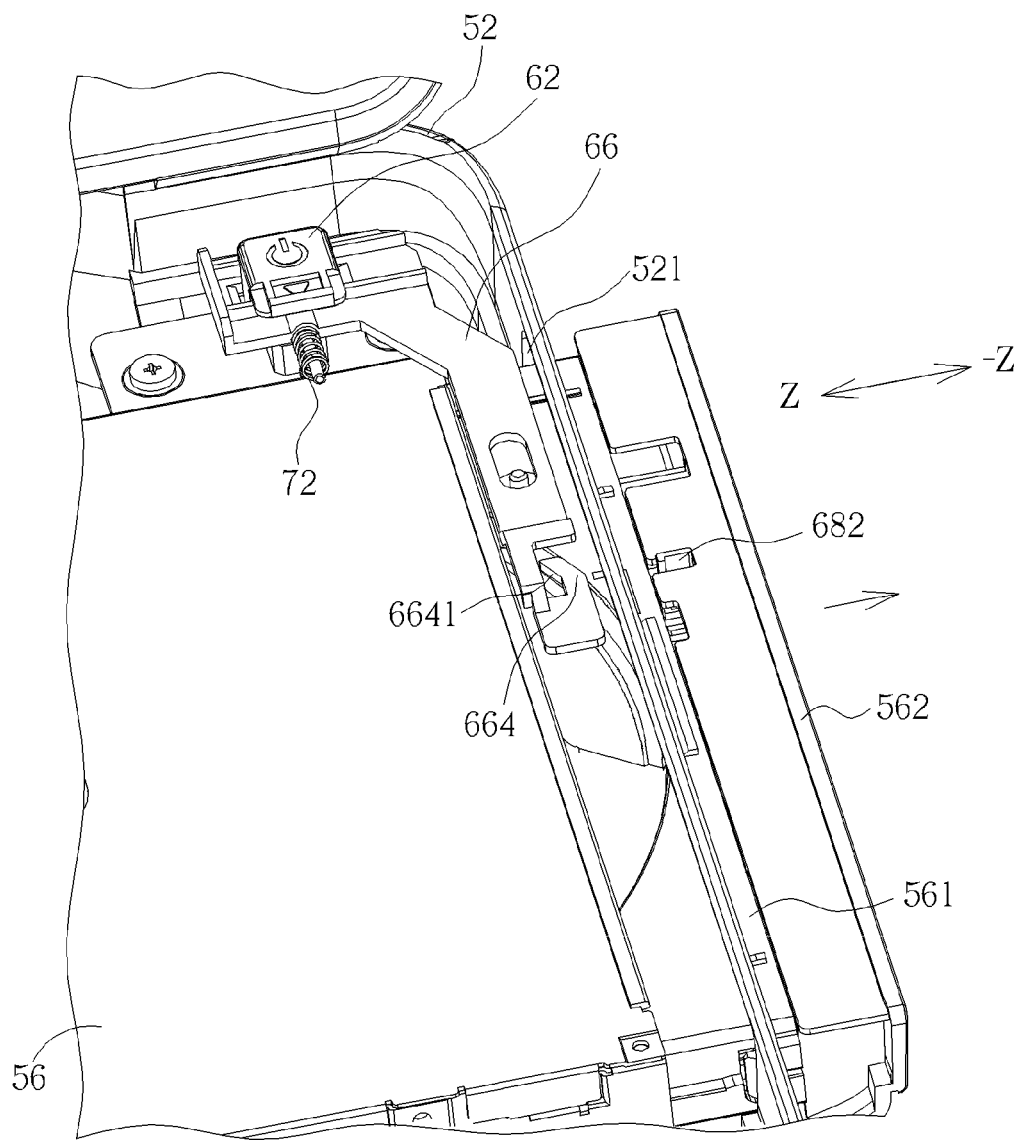

Please refer to FIG. 5 to FIG. 9. FIG. 5 to FIG. 9 are diagrams of the switch mechanism 60 activating the second switch component 58 according to the embodiment of the present invention. An inclined structure 664 is formed on the linking component 66, and the inclined structure 664 is for sliding relative to the activating component 68, so as to drive the activating component 68 to activate the second switch component 58 in the third direction (+Z direction). In addition, the inclined structure 664 includes an inner inclined surface 6641 and an outer inclined surface 6642. Please refer to FIG. 1 and FIG. 3. The activating component 68 installed on the plate 562 further includes an activating portion 681 and a linking portion 682. The activating portion 681 is for activating the second switch component 58, and the linking portion 682 is connected to the activating portion 681. As users desire to open the tray 561 of the expansion module 56, users can press the button 62 in the second direction (+Y direction). Because the linking component 66 is engaged with the button 62, the linking component 66 also moves in the second direction (+Y direction) at the same time. At this time, the linking portion 682 can move from an initial position of a rear side 6643 of the inclined structure 664 as shown in FIG. 5 to the inner inclined surface 6641 of the inclined structure 664. Then, as shown in FIG. 6, the linking portion 682 keeps moving along the inner inclined surface 6641. Finally, as shown in FIG. 7, as the linking portion 682 moves relative to the inner inclined surface 6641 to the activating position just before separating from the inclined structure 664, the activating portion 681 can move in the third direction (+Z direction) to activate the second switch component 58 to transmit an electrical signal to the expansion module 56, so as to drive the tray 561 and the linking portion 682 as shown in FIG. 8 and FIG. 9, to move in a direction (−Z direction) opposite to the third direction (+Z direction) to eject from the opening 521. The activating position mentioned herein is a position where the linking portion 682 is just separating from the inclined structure 664 and the activating portion 681 is activating the second switch component 58. It is noticed that the activating portion 681 activating the second switch component 58 and the linking portion 682 separating from the inclined structure 664 are at the same time, so that there is no structural interference between the activating component 68 and the tray 561 as the tray 561 is ejected from the opening 521 in the −Z direction. As a result, the tray 561 can be ejected smoothly.

Figure 10:
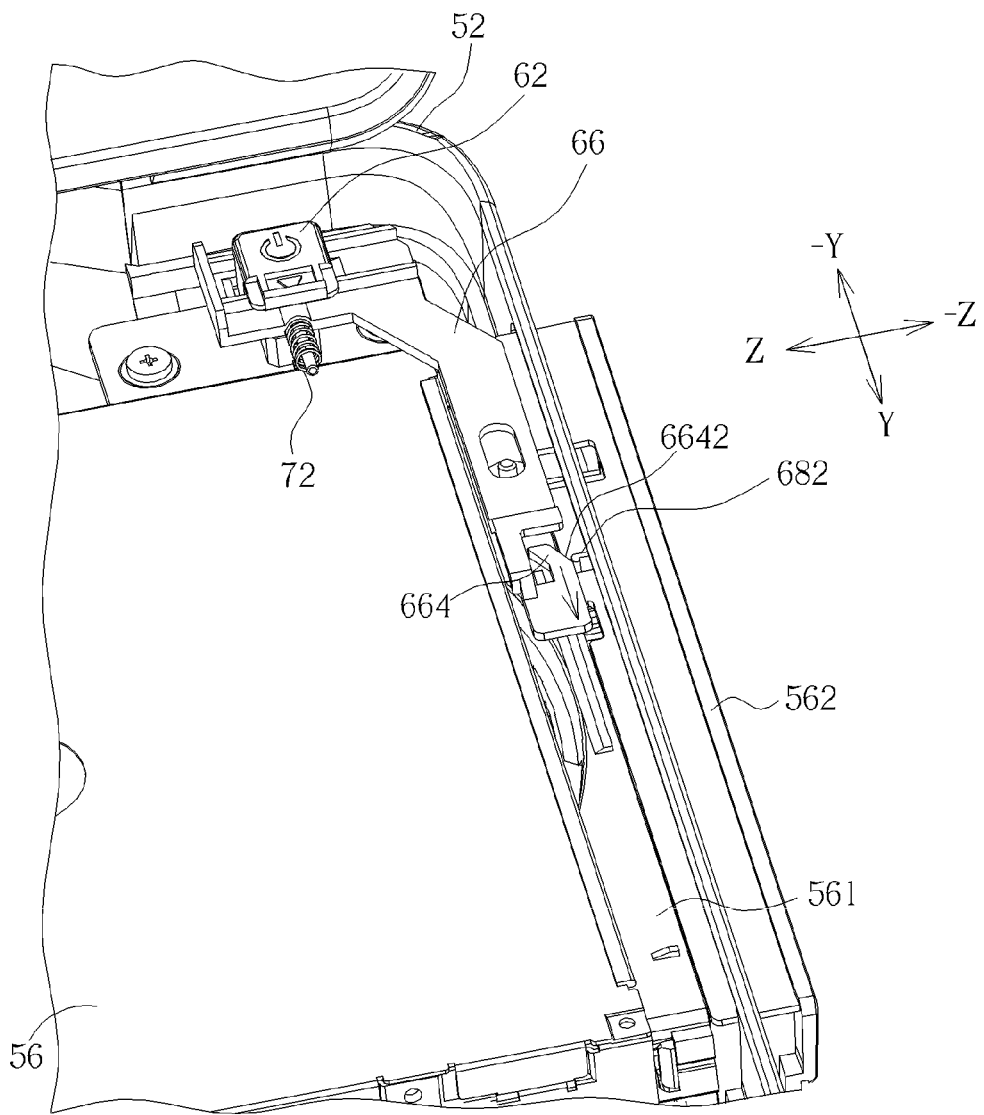
FIG. 10 to FIG. 12 are diagrams of a tray being pushed back into a casing according to the embodiment of the present invention.
Figure 11:
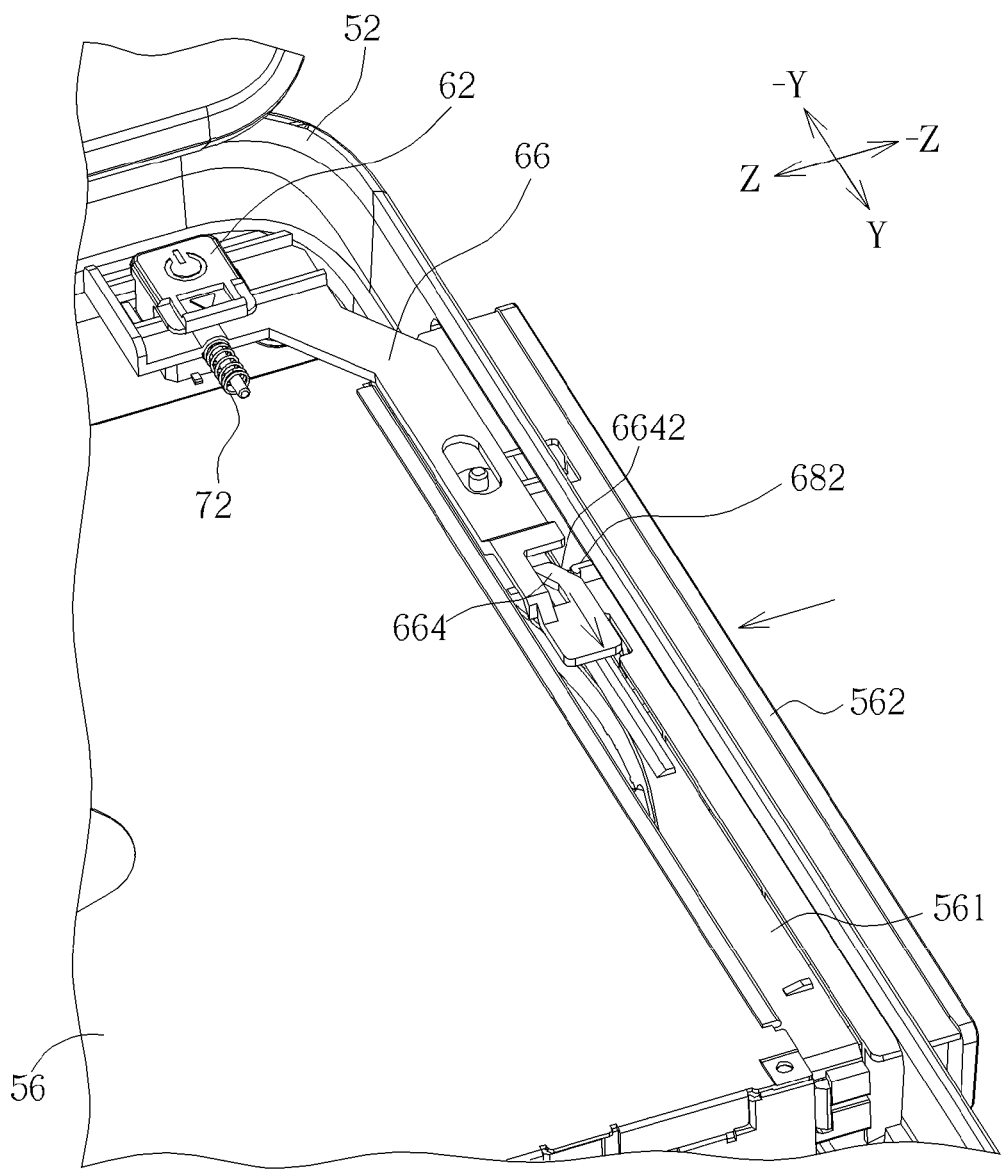
Figure 12:
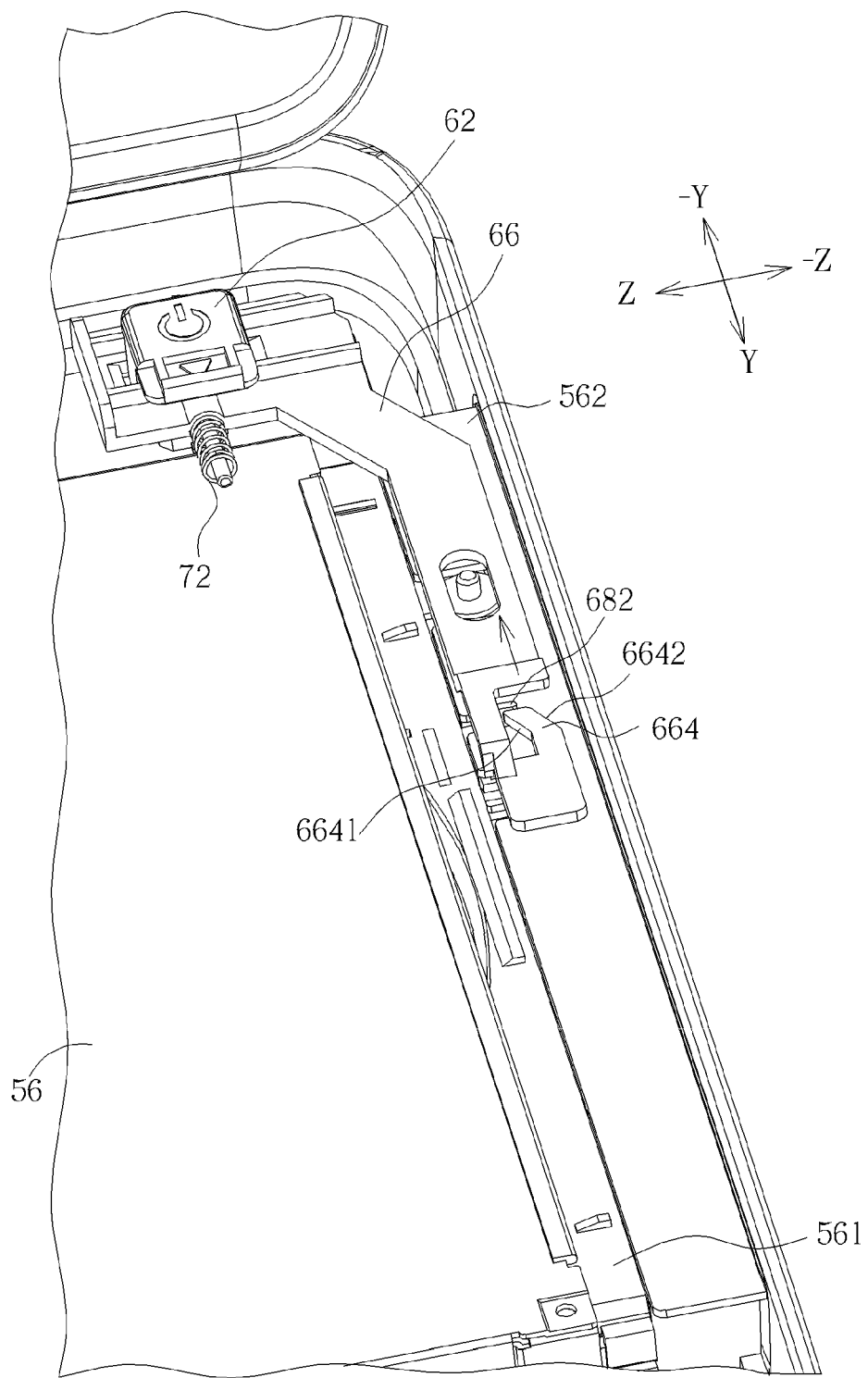

Please refer to FIG. 10 to FIG. 12. FIG. 10 to FIG. 12 are diagrams of the tray 561 being pushed back into the casing 52 according to the embodiment of the present invention. Users can push the tray 561 in the third direction (+Z direction), so as to push the tray 561 back into the casing 52. At this time, the linking portion 682 is driven in the third direction (+Z direction) simultaneously and contacts the outer inclined surface 6642 of the inclined structure 664 to slide relative to the outer inclined surface 6642, so that the linking component 66 moves in the second direction (+Y direction), as shown in FIG. 10 and FIG. 11. Finally, after the linking portion 682 moves relative to the linking component 66 to a position where the linking portion 682 is separated from the outer inclined surface 6642 as shown in FIG. 12, the linking portion 682 keeps being pushed in the third direction (+Z direction), and the linking component 66 is driven by a resilient force of the returning component 72 to move in the direction (−Y direction) opposite to the second direction (+Y direction). Finally, the linking component 66 returns back to a position as shown in FIG. 5, and the button 62 is returned to the position where the button 62 is not pressed. It is noticed that the first direction (+X direction), the second direction (+Y direction) and the third direction (+Z direction) can be non-vertical to one another. In addition, Mutual actuation of components of the present invention is not limited to a combination of specific directions. For example, it can be designed that the button 62 can move in the −Y direction to drive the linking component 66 as the activating component 68 moves relative to the inclined structure 664, so that the activating component 68 activates the second switch component 58 by rearranging the relative position of the activating component 68 and the inclined structure 664.

In contrast to the prior art, the switch mechanism and the portable electronic device of the present invention are to combine the button which activates the power switch component with the activating component which activates the switch component of the optical drive via the linking component, so that the button can include functions of activating the power switch component and the switch component of the optical drive at the same time. That is, the button has a function of activating different switches. The activating component for activating the switch component of the optical drive is disposed inside the plate of the optical drive module instead of disposing another button on the outside of the plate to activate the optical drive module in the prior art, so that the switch mechanism of the present invention can not only decrease the amount of the buttons on the portable electronic device, but also can implement a design style of the simple appearance for tending to be slim and light in recent years. Therefore, it can overcome a disadvantage of too many buttons on a conventional notebook computer and the optical drive without the simple appearance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switch mechanism, comprising:
   a button for moving in a first direction or a second direction;
   a pressing component connected to a bottom side of the button, and the pressing component being for pressing a first switch component when the button moves in the first direction;
   a linking component, an end of the linking component being connected to the button, and the linking component being driven by the button in the second direction as the button moves in the second direction; and
   an activating component detachably contacted with the linking component, and the activating component being driven by the linking component when the linking component moves to an activating position in the second direction, so as to activate a second switch component in a third direction.

2. The switch mechanism of claim 1, wherein an inclined structure is formed on the linking component, and the inclined structure is for sliding relative to the activating component, so as to drive the activating component in the third direction to activate the second switch component.

3. The switch mechanism of claim 2, wherein the activating component further comprises:
   an activating portion for activating the second switch component; and
   a linking portion connected to the activating portion, and the linking portion is at a rear side of the inclined structure as the linking component is in an initial position, the linking portion moving relative to an inner inclined surface of the inclined structure to separate from the inclined structure as the linking component moves in the second direction.

4. The switch mechanism of claim 3, wherein the linking portion contacts an outer inclined surface of the inclined structure after separating from the inclined structure and moving in a direction opposite to the third direction, and the linking portion is driven to slide in the third direction relative to the outer inclined surface of the inclined structure, so that the linking component moves in the second direction.

5. The switch mechanism of claim 1, wherein at least one engaging hole is formed on the end of the linking component, and the button comprises at least one hook for engaging with the at least one engaging hole.

6. The switch mechanism of claim 1, wherein a hole is formed on the linking component, and the pressing component passes through the hole as the button is pressed downward, so as to activate the first switch component.

7. The switch mechanism of claim 5, further comprising:
   a resilient component disposed on the pressing component between the button and the linking component, and the resilient component being for driving the button to move in a direction opposite to the first direction; and
   a returning component connected to the linking component, and the returning component being for driving the linking component to move in a direction opposite to the second direction.

8. The switch mechanism of claim 1, further comprising at least one engaging component for engaging with linking component, so as to constrain a movement of the linking component in the first direction.

9. The switch mechanism of claim 1, wherein a guiding slot is formed on the linking component, and the switch mechanism further comprises a fixing component passing through the guiding slot for guiding the linking component to move in the second direction.

10. The switch mechanism of claim 1, wherein the first direction, the second direction and the third direction are substantially orthogonal to one another.

11. A portable electronic device, comprising:
    a casing whereon an opening is formed;
    a first switch component installed inside the casing;
    an expansion module disposed in a position corresponding to the opening;
    a second switch component installed inside the casing, and the second switch component being for activating the expansion module; and
    a switch mechanism for activating the first switch component and the second switch component, and the switch mechanism comprising:
       a button for moving in a first direction or a second direction;
       a pressing component connected to a bottom side of the button, and the pressing component being for pressing the first switch component when the button moves in the first direction;
       a linking component, an end of the linking component being connected to the button, and the linking component being driven by the button in the second direction as the button moves in the second direction; and
       an activating component detachably contacted with the linking component, and the activating component being driven by the linking component when the linking component moves to an activating position in the second direction, so as to activate the second switch component in a third direction.

12. The portable electronic device of claim 11, wherein an inclined structure is formed on the linking component, and the inclined structure is for sliding relative to the activating component, so as to drive the activating component in the third direction to activate the second switch component.

13. The portable electronic device of claim 12, wherein the activating component further comprises:
    an activating portion for activating the second switch component; and
    a linking portion connected to the activating portion, and the linking portion is at a rear side of the inclined structure as the linking component is in an initial position, the linking portion moving relative to an inner inclined surface of the inclined structure to separate from the inclined structure as the linking component moves in the second direction.

14. The portable electronic device of claim 13, wherein the linking portion contacts an outer inclined surface of the inclined structure after separating from the inclined structure and moving in a direction opposite to the third direction, and the linking portion is driven to slide in the third direction relative to the outer inclined surface of the inclined structure, so that the linking component moves in the second direction.

15. The portable electronic device of claim 11, wherein the expansion module comprises a tray and a plate, the tray is movably disposed at the opening, the plate is connected to a side of the tray, the activating component is installed on the plate, and the tray is ejected from the opening in a direction opposite to the third direction after the activating component moves in the third direction to activate the second switch component.

16. The portable electronic device of claim 11, wherein at least one engaging hole is formed on the end of the linking component, and the button comprises at least one hook for engaging with the at least one engaging hole.

17. The portable electronic device of claim 11, wherein a hole is formed on the linking component, and the pressing component passes through the hole as the button is pressed downward, so as to activate the first switch component.

18. The portable electronic device of claim 16, further comprising:
- a resilient component disposed on the pressing component between the button and the linking component, and the resilient component being for driving the button to move in a direction opposite to the first direction; and
- a returning component connected to the linking component, and the returning component being for driving the linking component to move in a direction opposite to the second direction.

19. The portable electronic device of claim 11, further comprising at least one engaging component for engaging with linking component, so as to constrain a movement of the linking component in the first direction.

20. The portable electronic device of claim 11, wherein a guiding slot is formed on the linking component, and the switch mechanism further comprises a fixing component passing through the guiding slot for guiding the linking component to move in the second direction.

\* \* \* \* \*